United States Patent [19]
Ichikawa et al.

[11] Patent Number: 5,989,140
[45] Date of Patent: Nov. 23, 1999

[54] BOTH-SIDE MESHING TYPE SILENT CHAIN

[75] Inventors: Koichi Ichikawa; Nobuto Kozakura; Tsutomu Haginoya, all of Saitama-ken, Japan

[73] Assignee: Tsubakimoto Chain Co., Osaki, Japan

[21] Appl. No.: 09/037,834

[22] Filed: Mar. 10, 1998

[30] Foreign Application Priority Data

Mar. 19, 1997 [JP] Japan ................................. 9-066400

[51] Int. Cl.$^6$ .............. F16G 1/28; F16G 13/02; F16G 13/10; F16G 13/04
[52] U.S. Cl. ................ 474/148; 474/202; 474/206; 474/210; 474/212; 474/213; 474/226; 474/228
[58] Field of Search ................... 474/202, 206, 474/210, 212, 213, 226, 228

[56] References Cited

FOREIGN PATENT DOCUMENTS

| 0 487 146 | 5/1992 | European Pat. Off. . |
| 54-105636 | 8/1979 | Japan . |
| 54-112435 | 9/1979 | Japan . |
| 2 320 214 | 6/1998 | United Kingdom . |

*Primary Examiner*—Tamara L. Graysay
*Assistant Examiner*—Colby Hansen
*Attorney, Agent, or Firm*—Armstrong, Westerman, Hattori, McLeland & Naughton

[57] ABSTRACT

A both-side meshing type silent chain is provided which not only permits improvement in durability of a tensioner and a chain guide, but also permits a high-speed and smooth transfer of power. The both-side meshing type silent chain has a high durability and includes a plurality of articular train plates and a plurality of guide train plates. Each of the plurality of articular train plates and the plurality of guide train plates have main teeth for engagement with a sprocket disposed on an inner peripheral side of a chain. The plurality of articular train plates are alternately connected to the plurality of guide train plates with pins. Guide plates, which are guided by side faces of the teeth of the sprocket, are disposed on both outer sides of each of the plurality of guide train plates. Rear faces of the guide plates, which constitute a part of each of the plurality of articular train plates, the plurality of guide train plates, and the guide plates, and which are arranged in the longitudinal direction of the chain, are formed as flat faces. The rear faces, of a remainder of the plurality of articular train plates and plurality of guide train plates, are formed with sub-teeth for engagement with a sprocket located on an outer peripheral side of the chain.

3 Claims, 7 Drawing Sheets

BOTH-SIDE MESHING TYPE SILENT CHAIN

TECHNICAL FIELD OF THE INVENTION

The present invention generally relates to a silent chain and more particularly, to a both-side meshing type silent chain which can mesh with sprockets on both inner and outer peripheral sides of the chain.

DESCRIPTION OF THE RELATED ART

Figure 6:
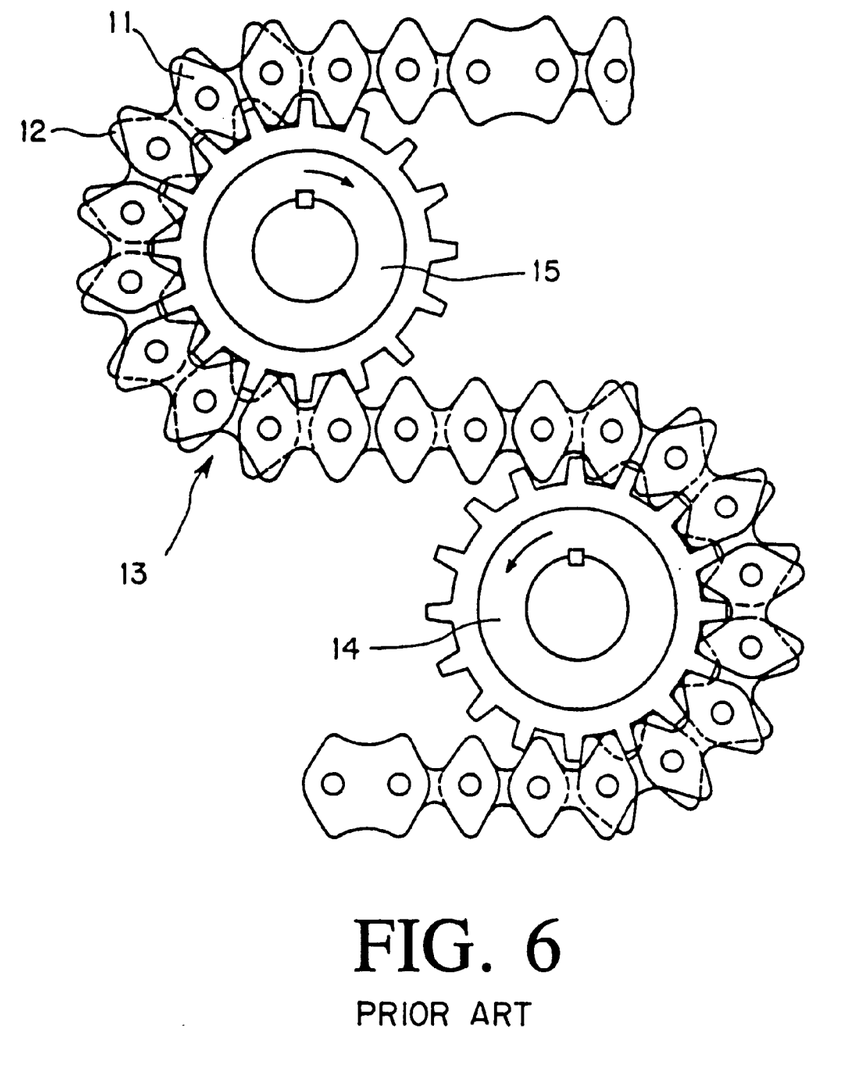
FIG. 6 is a schematic view showing an example of a conventional both-side meshing type silent chain.

As a conventional both-side meshing type silent chain which is capable of meshing with sprockets on both an inner peripheral side ("front side" hereinafter) and an outer peripheral side ("rear side" hereinafter) of the chain through a large number of plates connected together in an endless manner, a silent chain 13, such as is shown in FIG. 6, for example, is known. The silent chain 13 is assembled by connecting a large number of plates 11 and 12 in an endless fashion. The silent chain 13 has teeth for engagement with a sprocket 14 located on an inner or outer peripheral side of the chain 13. The silent chain 13 also has teeth for engagement with a sprocket 15 located on the opposite side of the sprocket 14. The plates 11 and 12 are centrally constricted and a pair of chevron-shaped teeth are formed symmetrically on the front and rear sides, respectively, of each plate.

Figure 7:
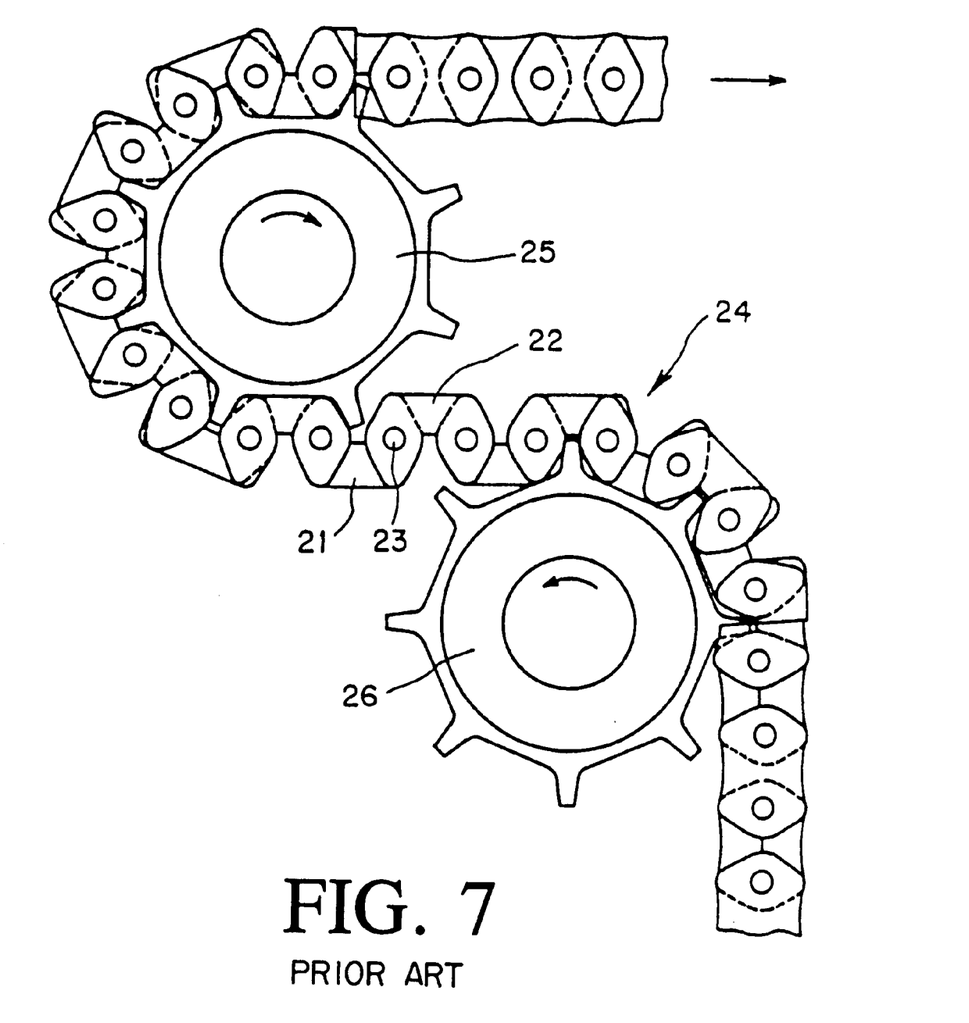
FIG. 7 is a schematic view showing another example of a conventional both-side meshing type silent chain.

FIG. 7 shows another example of a conventional both-side meshing type silent chain 24. The silent chain 24 is assembled in an endless manner. More particularly, plates 21, each having a pair of chevron-shaped teeth on the front side and each being flat on the rear side, and plates 22, each being flat on the front side and each having a pair of chevron-shaped teeth on the rear side, are alternately connected together with pins 23 to constitute the chain 24. A sprocket 25 is disposed so as to mesh with one of inner and outer peripheral sides of the silent chain 24 and a sprocket 26 is disposed so as to mesh with the other side. The sprockets 25 and 26 are each formed with teeth at two-pitch intervals, with which the teeth of the plates 21 and 22 come into engagement each individually.

If anyone of the above-described conventional silent chains, which are capable of meshing with sprockets on both inner and outer peripheral sides of the chain, is used as a timing chain for an automobile engine, for example, it becomes possible to bring an idle sprocket into engagement with the outer periphery on a tension side of a chain circulation path and thereby, draw the tension-side path as close as possible to a return-side path of the chain, wherein the space occupied by the entire chain circulation path can be diminished. However, since chevron-shaped teeth, for engagement with sprocket teeth, are formed on the rear side of the plate, it is difficult to bring the shoe faces of a tensioner and a chain guide into sliding contact with the rear face of the plate.

In more particular terms, if chevron-shaped teeth are formed on the rear side of the plate, the tops of the plate teeth come into contact with the shoe faces of the tensioner intermittently, so that the shoe faces are worn out markedly, leading to shortening of their service life, or the vibration preventing effect is decreased by the intermittent contact, thus causing wear elongation of the chain and leading to generation of noise.

Further, the plate shape of the conventional silent chain, as is shown in FIG. 6, has a central portion which is constricted so as to be small in cross-sectional area. This gives rise to the problem that the strength of the conventional silent chain, as is shown in FIG. 6, is greatly decreased in comparison with a silent chain which uses the ordinary type of plates with teeth formed on only the inner peripheral side.

In the conventional silent chain shown in FIG. 7, since every other one of the plates meshes with sprocket teeth, the amplitude of a polygonal motion upon engagement of the chain with the sprocket becomes so large that it is impossible to perform a smooth and high-speed transmission of power. The problem of early stage wear of the sprocket also results.

It is therefore an object of the present invention to solve the above-described problems of the prior art and to provide a both-side meshing type silent chain which permits improvement in service life of a tensioner and a chain guide, which permits a high-speed and smooth transmission of power, and which possesses a high durability.

SUMMARY OF THE INVENTION

According to the present invention, in order to achieve the above-mentioned object, a both-side meshing type silent chain is provided which includes: a plurality of articular train plates; a plurality of guide train plates, which are alternately connected to the plurality of articular train plates with pins, wherein the plurality of articular train plates and the plurality of guide train plates each have a front side with main teeth for engagement with teeth of a sprocket located on an inner peripheral side of the chain; and guide plates which are disposed on both outer sides of each of the plurality of guide train plates, wherein inside faces of the guide plates come into abutment with side faces of the teeth of the sprocket located on the inner peripheral side of the chain, thereby allowing the guide plates to be guided, and wherein rear faces of the guide plates, which constitute a part of each of the plurality of articular train plates, each of the plurality of guide train plates, and each of the guide plates, and which are arranged in the longitudinal direction of the chain, are formed as flat faces which substantially lie in a same plane when the chain is in a stretched state, and the rear faces of the guide plates, which constitute a remainder of the plurality of the articular train plates and a plurality of the guide train plates, are formed with sub-teeth for engagement with teeth of a sprocket located on an outer peripheral side of the chain.

In the operation of the both-side meshing type silent chain of the present invention, the main teeth, formed on both the plurality of articular train plates and the plurality guide train plates, come into engagement with the sprocket located on the inner peripheral side of the chain to effect the same transfer of power as in the conventional type of silent chains. In this case, the inside faces of the guide plates, which are disposed on both outer sides of the plurality of guide train plates, come into abutment against side faces of the teeth of the inner peripheral side sprocket and are guided thereby, so that a transverse displacement of the chain is prevented.

On the other hand, the sub-teeth, formed on the rear faces of the plurality of articular train plates, the plurality of guide train plates and the guide plates, come into engagement with the sprocket located on the outer peripheral side of the chain, whereby the transfer of power is performed.

With respect to the plates whose rear faces are formed as flat faces, a component of the tension exerted on the chain, which component acts radially inwardly of the sprocket, can be prevented from being applied to the sub-teeth by causing the rear faces of the plates to be abutted against and supported by the tops of the teeth of the sprocket located on the outer peripheral side of the chain.

Further, the shoe faces of a tensioner and a chain guide are brought into sliding contact with the rear face of each of the plates arranged as a plate train in the longitudinal direction of the chain and whose rear faces are formed as flat faces, thereby preventing vibration of the chain.

DETAILED DESCRIPTION OF THE INVENTION

Figure 1:
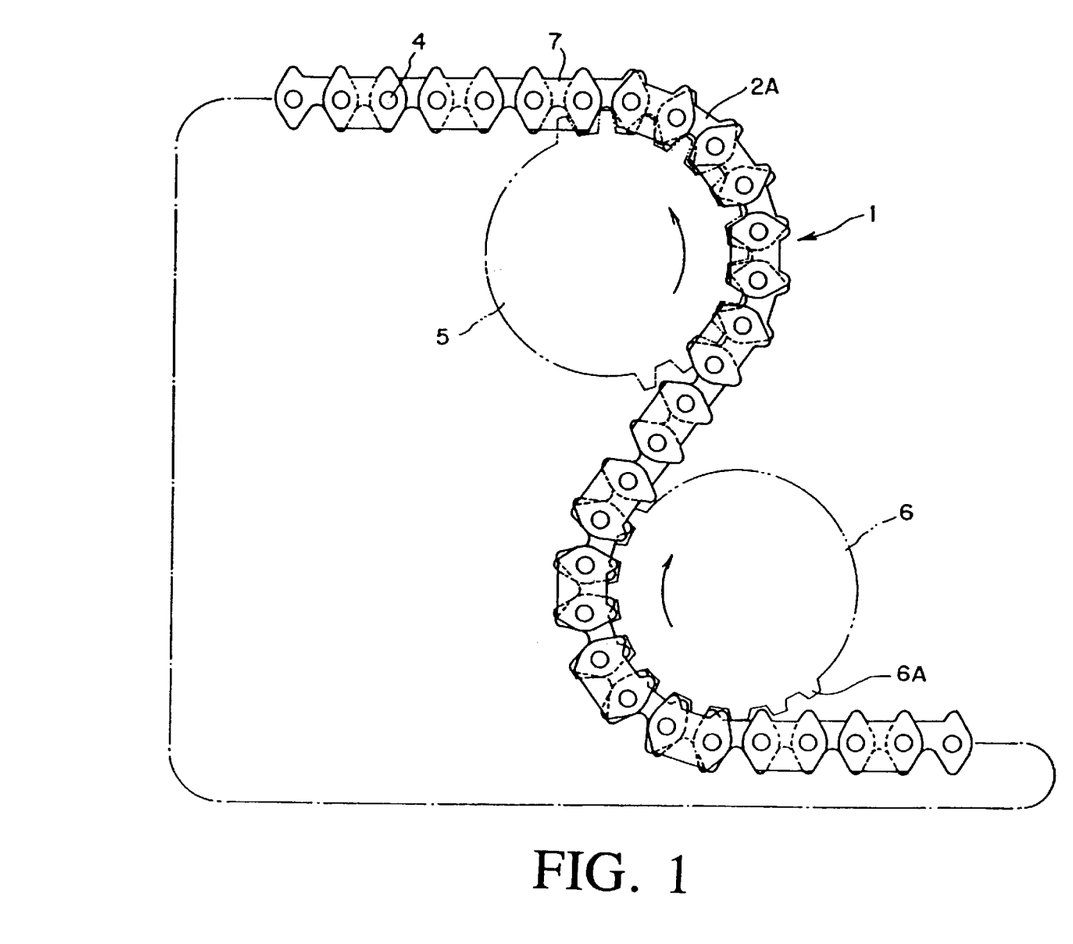
FIG. 1 is a schematic view of a both-side meshing type silent chain according to a first embodiment of the present invention.
Figure 2:
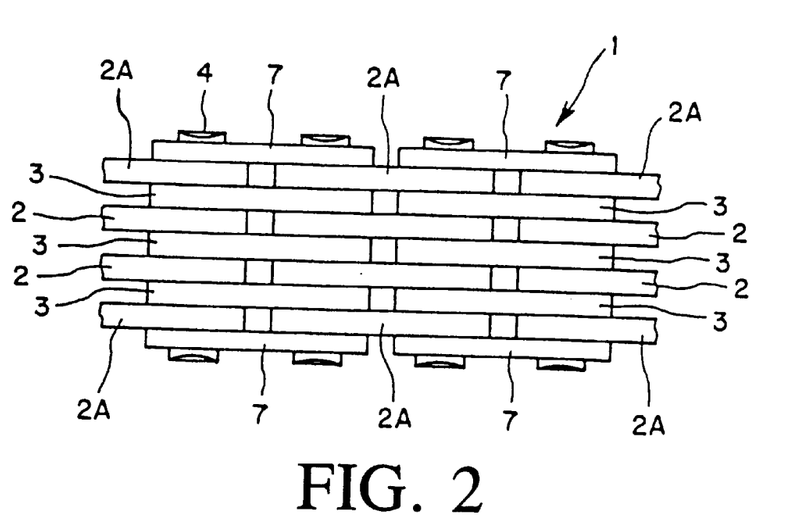
FIG. 2 is a partial plan view of the silent chain of FIG. 1.

The present invention will now be described in detail with reference to the drawing figures. FIG. 1 is a schematic view of a both-side meshing type silent chain hereinafter referred to simply as "chain") according to a first embodiment of the present invention, and FIG. 2 is a partial view of the chain as seen from its outer peripheral side. The chain 1 is assembled by alternately connecting a large number of articular train plates 2 and guide train plates 3 with pins 4 in an endless manner. The chain 1 travels in a circular direction, while meshing with a sprocket 5 disposed on a inner peripheral side of the chain 1 and then, the chain 1 travels in an opposite circular direction, while meshing with a sprocket 6 disposed on an outer peripheral side of the chain.

Referring to FIG. 2, the articular train plates 2 and the guide train plates 3 are each disposed transversely in a plural number, and the guide plates 7 are disposed on both outer sides of the outer most guide train plates 3.

Figure 3:
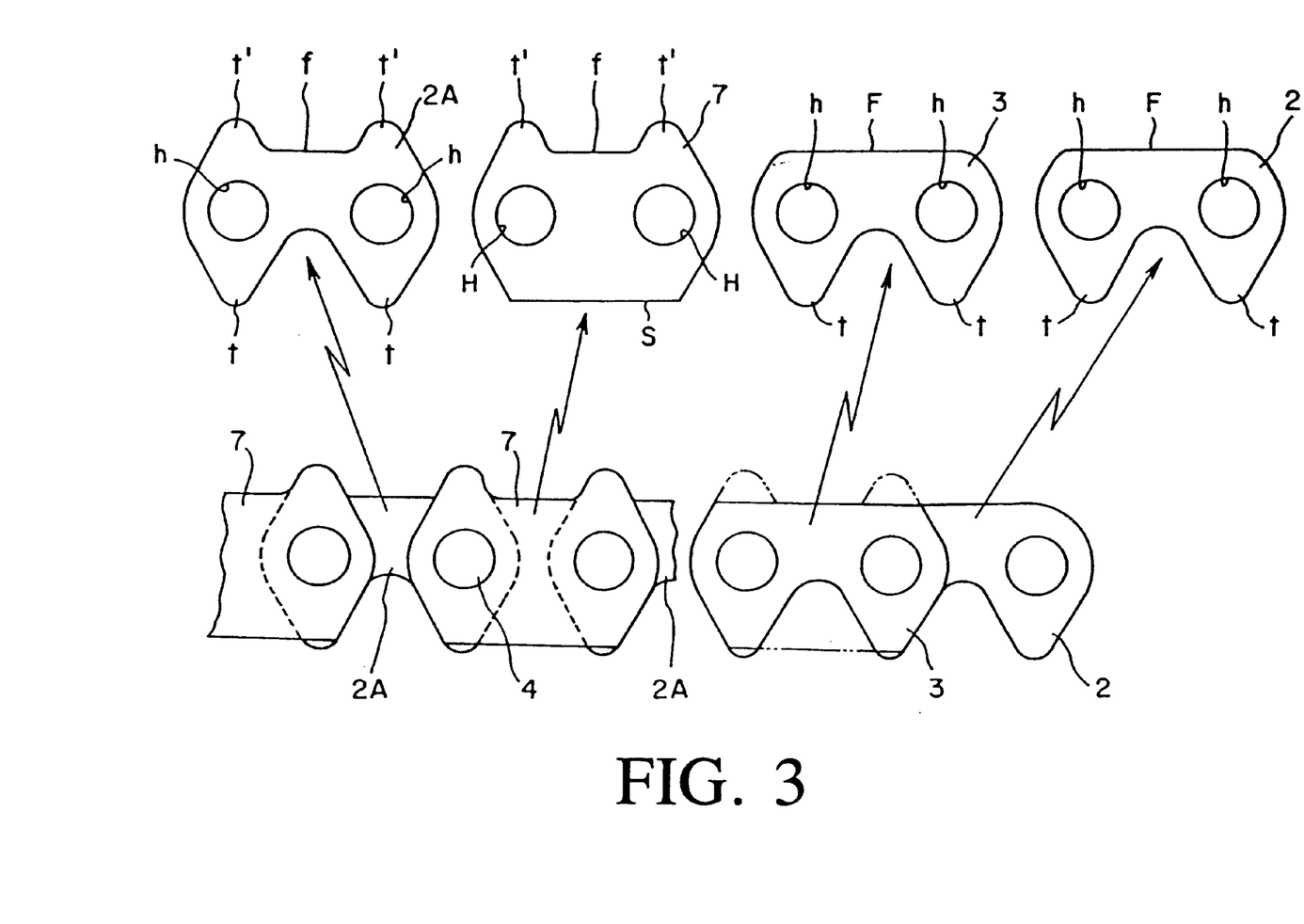
FIG. 3 is a diagram showing shapes of various plates which constitute the silent chain of FIG. 1.

FIG. 3 is a diagram showing the shape of each plate as a constituent of the chain 1. As shown in FIG. 3, the articular train plates 2 and the guide train plates 3 are of the same shape, with each having two pin holes for insertion of a pin 4 therein.

On the front side of each of the plates 2 and 3, a pair of main teeth t are formed so as to be in a bifurcated shape. The main teeth t come into engagement with the sprocket 5 located on the inner peripheral side of the chain 1 of FIG. 1.

The shape of the main teeth t is the same as the shape of the teeth of the plates used in a conventional silent chain. The shape of the teeth of the sprocket 5 is the standard tooth shape. Like the plates of a conventional silent chain, the rear faces of the articular train plates 2 and guide train plates 3 are formed as flat faces F so as to be flush with one another in a rectilinearly stretched state of the chain 1.

The guide plates 7 are each formed with two pin holes H to be fitted around pins 4 at each of both ends of the pins 4. On the front side of each guide plate 7, a flat face S is formed so as to cover almost all the portions of main teeth t of each of the articular train plates 2 and guide train plates 3.

On the rear side of each guide plate 7 and the rear side of the articular train plate 2A adjacent to the inside face of the guide plate, sub-teeth t' are formed for engagement with teeth of the sprocket 6 located on the outer peripheral side of the chain. The sub-teeth t' are projected from the flat faces F which form the rear faces of the articular train plates 2 and guide train plates 3.

In each of the guide plates 7 and articular train plates 2A, the sub-teeth t' are spaced from each other through a flat face f, which is formed at the same level as the flat face F of each of the guide train plates 3. On the front side of each of the articular train plates 2A, main teeth t are formed of the same shape as the main teeth of the other articular train plates 2 and guide train plates 3.

The inside faces on the front side of the guide plates 7 are adapted to abut side faces of teeth of the sprocket 5 located on the inner peripheral side of the chain 1 in FIG. 1, thereby inhibiting a lateral shift of the chain 1, to prevent meandering of the chain at the time of engagement with the sprocket 5.

On the other hand, the sprocket 6 located on the outer peripheral side of the chain 1, has the tops 6A of the teeth formed in the shape of an arcuate face concentric with the rotational center of the sprocket 6. Upon engagement of the sprocket 6 with the chain 1, the tops 6A of the arcuate teeth abut and support the flat faces F, which form rear faces of the articular train plates 2 and guide train plates 3, and the flat faces f are each located between a pair of sub-teeth t' of each of the guide plates 7 and the articular train plates 2A adjacent thereto. Thus, a component of the tension exerted on the chain 1, which component acts radially inwardly of the sprocket 6, is prevented from being applied to the sub-teeth t'.

It is not always necessary that the flat faces f of the guide plates 7 and articular train plates 2A be at the same level as the flat faces F forming rear faces of the guide train plates 3. The flat faces f may be spaced from the teeth tops 6A of the sprocket 6 at the time of engagement of the chain 1 and the sprocket 6.

Like the main teeth t, the sub-teeth t' may also be formed in a bifurcated shape. But if the guide plates 7 and the articular train plates 2A are largely centrally constricted, the resulting concentration of a load thereon will cause deterioration in strength therein. Therefore, as in the first embodiment, it is desirable to form the flat faces f at the same level as the flat faces F, which form rear faces of the articular train plates 2 and guide train plates 3.

Figure 4:
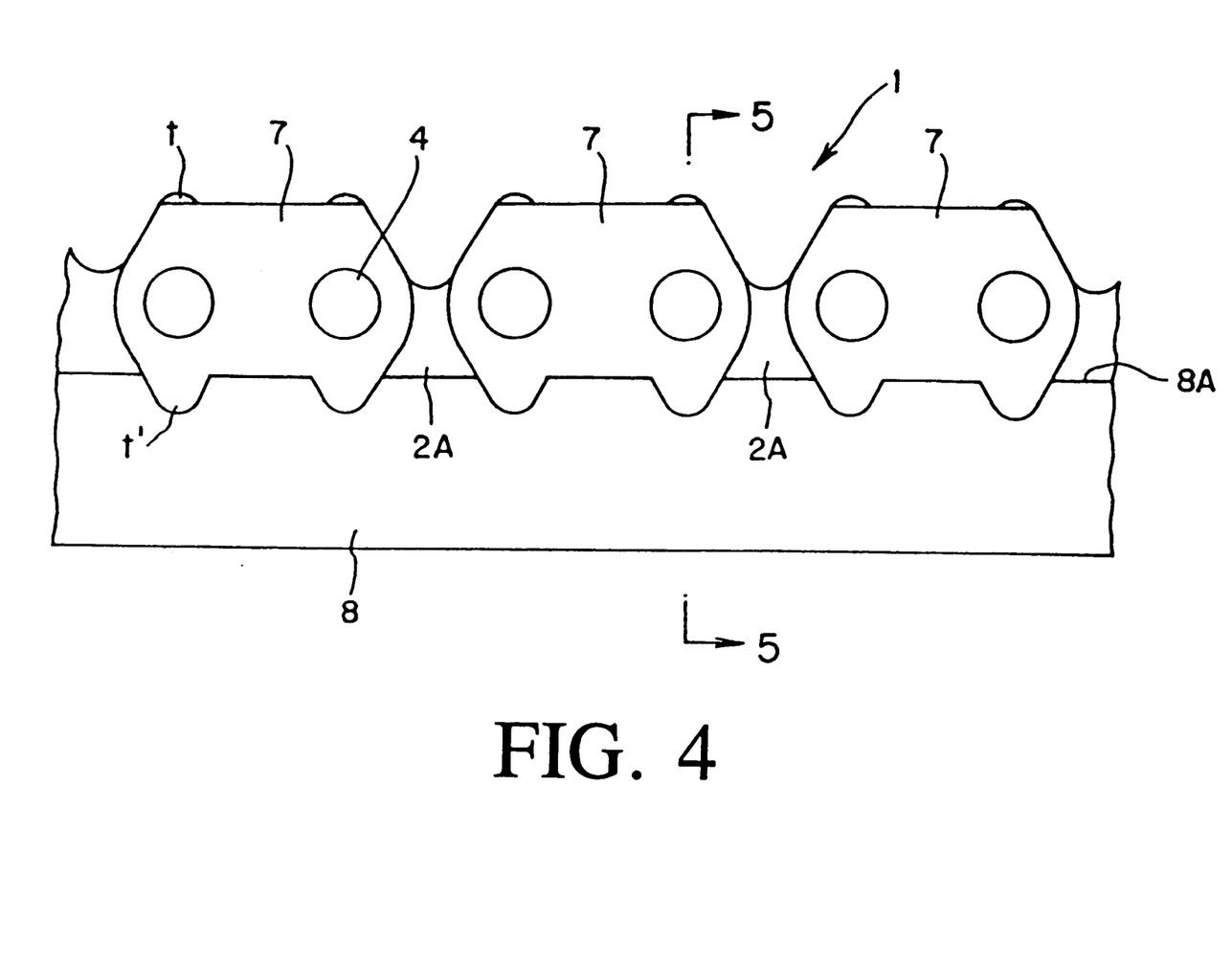
FIG. 4 is a diagram showing a state in which the silent chain of FIG. 1 is in sliding contact with the shoe face of a chain guide disposed on an outer peripheral side of the chain.
Figure 5:
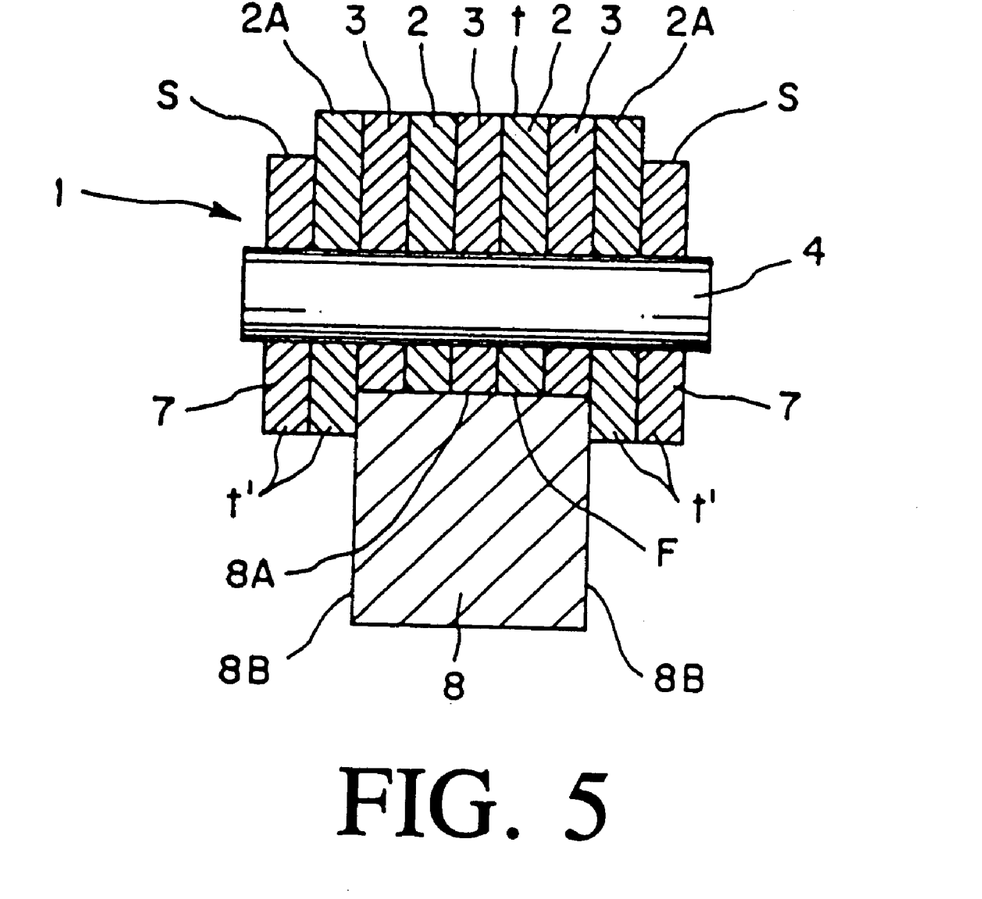
FIG. 5 is a cross sectional view taken along line 5—5 of FIG. 4.

FIG. 4 is a side view showing a state in which the chain 1 travels while being guided by a chain guide 8 disposed on the outer peripheral side of the chain, and FIG. 5 is a cross-sectional view taking along line 5—5 of FIG. 4. The flat surfaces F, while form rear surfaces of the articular train plates 2 and guide train plates 3, are in sliding contact with a shoe face 8A of the chain guide 8, while inside faces of the sub-teeth t', projecting from the articular train plates 2A located on both sides of plural, laterally arranged, articular train plates 2, come into abutment with side guide faces on both sides of the chain guide 8 to inhibit a lateral movement of the chain 1 and thereby prevent meandering of the chain 1.

Since the flat faces F of plural articular train plates 2 and guide train plates 3 slide continuously on the shoe face 8A of the chain guide 8, the chain 1 travels smoothly with little vibration or noise. The wear of the shoe face 8A is also reduced.

In the first embodiment, as described above, sub-teeth t' are formed on only the rear faces of both-side guide plates 3 and of the articular train plates 2 adjacent to the inside faces of the guide plates, while the rear faces of the other articular train plates 2 and all the guide train plates 3 are formed as flat faces. However, the present invention is not limited to this construction. Any other construction may be adopted insofar as only the rear faces of the plates which constitute a part of the plural trains of articular train plates, guide train plates and guide plates, arranged in the longitudinal direction of the chain, are formed as flat faces which lie substantially in the same plane when the chain is in a stretched state and the rear faces of all of the plates that constitute the remaining train or trains are formed with sub-teeth.

For example, a construction may be adopted in which both-side guide plates, the articular train plates adjacent to the inside faces of the guide plates, and the guide train plates adjacent to the inside faces of those articular train plates, are each formed with sub-teeth, and the rear faces of the other articular train plates and guide train plates are formed as flat faces. A construction also may be adopted in which two or three trains of plates, arranged longitudinally of the chain and having flat rear faces, and two or three trains of plates whose rear faces are formed with sub-teeth, are arranged alternately in the transverse direction of the chain.

In the case of using a tensioner and a chain guide for the chain, the shoe faces of the tensioner and the chain guide may be formed in any cross-sectional shape which permits sliding contact with only the plates having flat rear faces and which does not permit contact with the plates having sub-teeth on the rear side.

In the both-side meshing type silent chain according to the present invention, as set forth above, the rear faces of the plates, which constitute a part of the plural trains of the articular train plates, guide train plates and guide plates, arranged in the longitudinal direction of the chain, are formed as flat faces which lie substantially in the same plane when the chain is in a stretched state. Therefore, vibration of the chain can be smoothly prevented by bringing the flat faces into sliding contact with the shoe faces of a tensioner and a chain guide. Hence, it is possible to not only prolong the service life of the shoe, but also enhance the strength of the chain in comparison with a conventional both-side meshing type silent chain assembled using plates having a centrally constricted shape.

Besides, since the sub-teeth can be brought into pitch-by-pitch engagement with the teeth of the sprocket located on the outer peripheral side of the chain, the chain can be driven smoothly with reduced vibration and noise. The wear of the sprocket can also be diminished.

Moreover, since the rear faces of plates, formed as flat faces, are abutted against and supported by the tops of the teeth of the sprocket, a component of the tension exerted on the chain can be prevented from being applied to the sub-teeth, whereby the drive torque and durability of the sub-teeth can be enhanced.

Further, since the both-side meshing type silent chain according to the present invention can be used as an engine timing chain with the shoe faces of a tensioner and a chain guide being in abutment with the outer peripheral side of the chain, it is possible to bring an idle sprocket into engagement with the outer periphery on a tension side of the chain circulation path and draw the tension-side path as close as possible to a return-side path, resulting in that not only the space occupied by the entire chain circulation path can be diminished, but also, by engaging a sprocket with the chain from the outer peripheral side of the chain, it is made possible to drive an auxiliary machine, such as an oil pump, which rotates reversely from the driving shaft.

We claim:

1. A both-side meshing type silent chain comprising:
    a plurality of articular links, each of said articular links having at least two articular plates, each of said articular plates of said plurality of articular links defining articular plate rows in a longitudinal direction of said silent chain;
    a plurality of guide links, each of said guide links having at least one intermediate plate and two guide plates disposed on both outer sides of said intermediate plate, each of said intermediate plates of said plurality of guide links defining at least one intermediate plates row in the longitudinal direction of said silent chain, each of said guide plates of said plurality of guide links defining guide plates rows in the longitudinal direction of said silent chain, each of said articular links being alternately connected to each of said guide links with pins;
    wherein each of said articular plates and each of said intermediate plates have a front side with main teeth for engagement with teeth of a sprocket located on an inner peripheral side of said silent chain, wherein inside faces of said guide plates come into abutment with side faces of said teeth of said sprocket and are guided thereby;
    wherein rear faces of plate rows, which constitute a part of each of said articular plate rows, each of said intermediate plate rows and each of said guide plate rows, are formed as flat faces which substantially lie in a same plane when said silent chain is in a stretched state; and
    wherein rear faces of plate rows, which constitute a remainder of each of said articular plate rows, each of said intermediate plate rows and each of said guide plate rows, are formed with sub-teeth for engagement with teeth of a sprocket located on an outer peripheral side of said silent chain.

2. The both-side meshing type silent chain according to claim 1, wherein said sub-teeth are formed on rear faces of said guide plates, thereby allowing said sub-teeth to interpose a shoe for guiding said chain.

3. The both-side meshing type silent chain according to claim 1, wherein said sub-teeth are formed on rear faces of said guide plates and on rear faces of said intermediate plates on both sides, thereby allowing said sub-teeth to interpose a shoe for guiding said chain.

* * * * *